(12) United States Patent
Grosse Bley et al.

(10) Patent No.: US 7,874,201 B2
(45) Date of Patent: *Jan. 25, 2011

(54) LEAKAGE SEARCH ASSEMBLY HAVING A SNIFFING PROBE

(75) Inventors: Werner Grosse Bley, Bonn (DE); Sandra Seitz, Duesseldorf (DE)

(73) Assignee: INFICON GmbH (DE)

( * ) Notice: Subject to any disclaimer, the term of this patent is extended or adjusted under 35 U.S.C. 154(b) by 348 days.

This patent is subject to a terminal disclaimer.

(21) Appl. No.: 11/991,658

(22) PCT Filed: Aug. 17, 2006

(86) PCT No.: PCT/EP2006/065421

§ 371 (c)(1),
(2), (4) Date: Mar. 7, 2008

(87) PCT Pub. No.: WO2007/031386

PCT Pub. Date: Mar. 22, 2007

(65) Prior Publication Data

US 2009/0288477 A1  Nov. 26, 2009

(30) Foreign Application Priority Data

Sep. 13, 2005  (DE)  .................. 10 2005 043 494

(51) Int. Cl.
*G01M 3/04* (2006.01)
(52) U.S. Cl. ........................... 73/40.7; 73/40
(58) Field of Classification Search ............. 73/40–49.8
See application file for complete search history.

(56) References Cited

U.S. PATENT DOCUMENTS 2,947,166 A  8/1960  Palmer et al.
3,645,127 A  2/1972  Mongodin et al.
4,262,522 A *  4/1981  Reich ...................... 73/23.2
4,735,084 A *  4/1988  Fruzzetti ................. 73/40.7

(Continued)

FOREIGN PATENT DOCUMENTS

DE  2441124  3/1976

(Continued)

OTHER PUBLICATIONS

International Search Report and Written Opinion dated Dec. 6, 2006 based on PCT application No. PCT/EP06/065421.

(Continued)

*Primary Examiner*—David A. Rogers
(74) *Attorney, Agent, or Firm*—Ohlandt, Greeley, Ruggiero & Perle, LLP

(57) ABSTRACT

The leakage search assembly has a main device which contains a vacuum pump and a test gas sensor, and a hand-held sniffing probe. Capillary lines which connect the sniffing probe to the basic assembly contain valves by means of which these lines can be selectively opened. In a leakage search mode, the capillary line having the larger cross section is open. This results in leaks also being found from a greater distance. The dead time before response of the test gas sensor is shortened. Once a leak has been located, the assembly is switched to the leakage rate measurement mode, in which only the capillary line with the smaller cross section is open. This results in quantitative determination of the leakage rate with high accuracy and high stability.

6 Claims, 1 Drawing Sheet

U.S. PATENT DOCUMENTS

| | | | |
|---|---|---|---|
| 4,785,666 | A | 11/1988 | Bergquist |
| 5,537,857 | A | 7/1996 | Grosse-Bley |
| 5,907,092 | A | 5/1999 | Bohm |
| 6,179,444 | B1 | 1/2001 | Plesko |
| 2002/0073767 | A1* | 6/2002 | Webb et al. .................. 73/40.7 |
| 2003/0233866 | A1* | 12/2003 | Widt ............................. 73/40 |
| 2004/0154379 | A1* | 8/2004 | Enquist et al. ............... 73/40.7 |
| 2006/0090546 | A1* | 5/2006 | McCoy et al. ................ 73/40.7 |
| 2006/0174696 | A1* | 8/2006 | Komninos ............... 73/40.5 A |
| 2008/0000288 | A1 | 1/2008 | Grosse-Bley |
| 2008/0276692 | A1* | 11/2008 | Wetzig et al. ................ 73/40.7 |
| 2009/0120165 | A1* | 5/2009 | Lang et al. ................... 73/40.7 |

FOREIGN PATENT DOCUMENTS

| | | | |
|---|---|---|---|
| DE | 2441124 | A * | 3/1976 |
| DE | 3247975 | | 6/1984 |
| DE | 3801893 | | 2/1989 |
| DE | 4445829 | | 6/1996 |
| DE | 4445929 | | 6/1996 |
| DE | 19504278 | | 8/1996 |
| DE | 19735250 | | 2/1999 |
| DE | 19846798 | | 4/2000 |
| DE | 19911260 | | 9/2000 |
| DE | 102005009713 | | 9/2006 |
| GB | 2072852 | | 10/1981 |
| JP | 62025229 | | 2/1987 |
| JP | 11153507 | | 6/1999 |
| WO | WO 03/008923 | | 1/2003 |
| WO | WO03/008923 | | 1/2003 |

OTHER PUBLICATIONS

International Preliminary Search Report for PCT/EP02/06986.

* cited by examiner

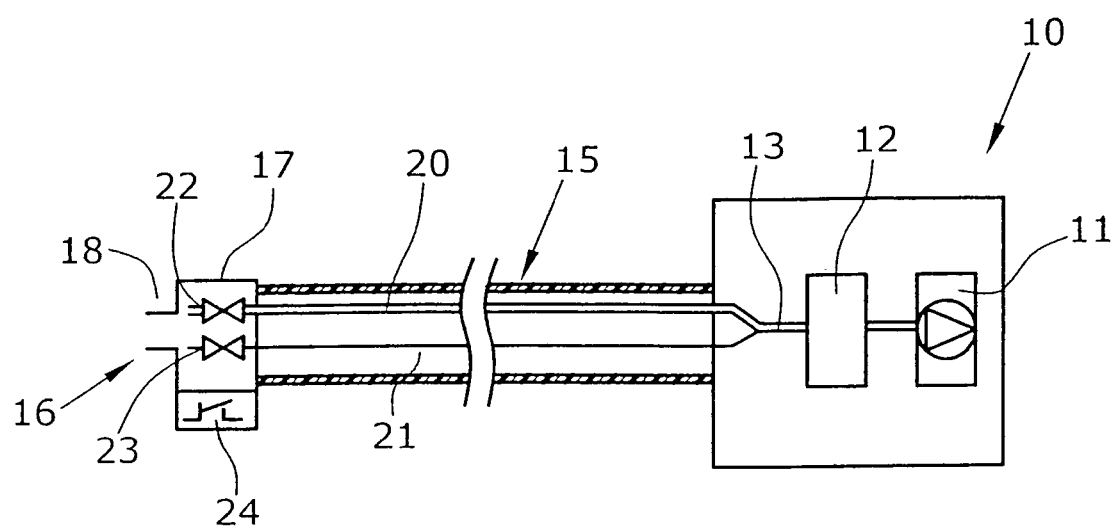

LEAKAGE SEARCH ASSEMBLY HAVING A SNIFFING PROBE

BACKGROUND

1. Field of the Disclosure

The disclosure refers to a leakage search assembly having a sniffing probe, which comprises a main device containing a vacuum pump and a tracer gas sensor and which is connected with a sniffing probe via a flexible tubing.

2. Discussion of the Background Art

DE 44 45 829 A1 (Leybold AG) describes a counter-flow sniffing leakage search device having a high vacuum pump stage at the end of a sniffing hose. A sniffing hose of approximately 4 m in length is used which is designed as a capillary line and has an inner diameter of approximately 0.4 mm. The sniffing hose provides a throttling effect required to maintain the vacuum generated at its outlet end.

DE-OS 24 41 124 describes a leakage search device having a sniffing hose, wherein the hose has a relatively large diameter. A throttle is provided right in front of the tracer gas sensor, which is a mass spectrometer. By arranging the throttle right in front of the tracer gas sensor, the vacuum pump can convey the gas to be analyzed more quickly from the inlet of the sniffing probe to directly in front of the throttle, i.e. to the tracer gas sensor. Thus, the response time that depends on the length of the flexible tubing, is reduced.

German patent application DE 10 2005 009 713 (not pre-published) describes a leakage search assembly having a sniffing probe, where the flexible tubing connecting the sniffing probe to a main device includes at least two capillary lines which may be selectively closed either in the main device or in the sniffing probe. By opening of one or several valves selectively, it is possible to select the capillary line through which air is to be aspirated. Thus, by choosing a capillary line with a specific cross section, the dead time can be varied. Moreover, two different types of devices that operate with different gas flow rates can be used in combination with the same flexible tubing.

It is a problem of sniffing leakage search that large portions of the item under test have to be searched as quickly as possible to first find a leak in that process. Thereafter, the leak found has to be assessed with respect to its size, the reference value used being a previously set trigger signal. These two requirements are in conflict with each other, since a short response time and a good distance sensitivity are required for an efficient leakage search, and for a quantitative evaluation, however, a high stability of the signal is needed that can not easily be achieved in a quick measurement.

Leakage search assemblies are known from practice that allow a leakage search mode and a leakage rate measuring mode to be performed. With assemblies having a differentiating display, where the derivative of a measurement signal is determined as a function of time so as to suppress constant background concentrations, the highest possible pre-amplifier sensitivity is selected in the search mode so as to detect low concentrations of leakage gas already at a greater distance from the leak. With assemblies having a non-differentiating direct display, a search trigger level is defined that is significantly lower than the actual trigger limit. In either instance, increasing the sensitivity or lowering the trigger level does not enhance the distance sensitivity, because the cloud of leakage gas forming around the leak is very limited, especially with heavy gases having a low coefficient of diffusion, such as refrigerants, for example. Should the amplification be increased, a greater signal noise would have to be accepted. If the noise is reduced by a longer averaging time, the signal will rise much more slowly, decreasing the possible searching speed. With non-differentiating displays, slow background variations can only be corrected by repeated manual zero point adjustment which is difficult given the increased sensitivity in the search mode.

It is the object of the disclosure to provide a leakage search assembly having a sniffing probe, which allows to search large portions of an item under test as fast as possible and to quickly find each leak in the process, and which also allows for an exact determination of the size of the leak.

SUMMARY OF THE DISCLOSURE

The present leakage search assembly is characterized by a flexible tubing which comprises at least a first passage and a second passage having different cross sections, wherein at least the passage having the larger cross section is provided with a valve and wherein a switch is provided for switching between a leakage search mode, in which the larger passage is open, and a leakage rate measuring mode, in which the larger passage is blocked.

In the leakage search mode, the search for leaks is performed with the larger cross section, whereby a large range and a short response time are obtained. It is thus achieved that leaks can also be detected from a greater distance, because due to the strong aspirating effect and a faster movement of the sniffing probe, a large amount of leakage gas is momentarily aspirated from the cloud in front of the leak and is displayed immediately. Both the dead time and the rise time are minimal, enhancing the leakage search. It is not the amplification which is increased, which could lead to erroneous measurements of small disturbing concentrations. Rather, it is the flow rate that is increased, whereby the detection of gas from the cloud in front of the leak is enhanced.

In contrast therewith, measuring the leakage rate is performed with a small flow rate, resulting in a short range. Thus, it is achieved that during the measurement at the leak position known from the search, the leak is measured quantitatively correctly and with great stability. Background from the environment is minimized by the small flow rate.

In the leakage search mode, a defined environmental concentration of a gas is maintained regardless of the gas flow in the sniffing line. With a large gas flow in the sniffing line, a leakage gas flow results in a decrease in the gas concentration in the cloud formed around the leak, because air flowing in causes a dilution. Thus, with a large gas flow in the sniffing line, the defined background concentration in the environment will lead to a larger signal compared to the leak signal. Although the sniffing line with a higher gas flow rate results in a faster rise of the signal and a better distance sensitivity, the sensitivity to environmental contaminations of tracer gas is higher.

For the reasons mentioned above, in the leakage rate search mode, which is performed with a smaller gas flow rate, the sensitivity of the leakage search assembly to ambient contaminations is lower.

In the leak search mode, preferably a continuous automatic suppression of the background is performed. For this purpose, a means for detecting and displaying the variation in time of the tracer gas sensor signal may be provided. A differentiation device forming the derivative of the signal can be used to zero slowly varying signals, which include the background signals. Measuring the leakage rate, however, is performed without an automatic background compensation.

The different passages of the flexible tubing may be formed by capillaries extending within the flexible tubing and having different diameters. On the other hand, the passages may also be formed by differently sized inlet openings of capillaries by which the gas flow is throttled.

Preferably, each of the two passages is provided with a valve of its own, so that the passages can be opened and closed alternately. However, it is also possible to keep the smaller passage open continuously and to switch on the large passage only in the leak search mode.

Preferably, the carrier gas flow rates in both passages differ by at least a factor 10.

The following is a detailed description of an embodiment of the disclosure with respect to the sole FIGURE.

BRIEF DESCRIPTION OF THE DRAWINGS

The drawing schematically illustrates a leakage search assembly according to the disclosure.

DETAILED DESCRIPTION OF THE PREFERRED EMBODIMENT

The leakage search assembly comprises a main device 10 including the components that need not be moved during the sniffing leak search. The main device 10 is designed as a tabletop assembly or a floor-mounted assembly. Among others, it includes a vacuum pump 11 and a tracer gas sensor 12. A mass spectrometer or an infrared gas analyzer may serve as the tracer gas sensor. The vacuum pump 11 aspirates air through the tracer gas sensor 12. The inlet 13 of the tracer gas detector is connected with a flexible tubing 15. The flexible tubing that may have a length of several meters leads to the sniffing probe 16. The sniffing probe 16 is a hand-held device with a handle 17 and a sniffing pipe 18. It may be of a gun-shaped design. The same valve arrangement as in the hand-held device may also be provided in the main device.

The flexible tubing 15 includes a first capillary line 20 and a second capillary line 21, which connect the sniffing probe 16 with the main device 10. A valve arrangement formed by a first valve 22 and a second valve 23 is provided in the hand-held device 17. The first valve 22 is connected with the inlet of the first capillary line 20 and the second valve 23 is connected with the second capillary line 21. The inlets of both valves 22 and 23 are connected with the sniffing pipe 18. The valves 22 and 23 are solenoid valves that are controlled electrically by means of a switch 24 mounted on the hand-held device 17. However, it is also possible to use manually operated valves that are mechanically operated by the user at the hand-held device 17. Both valves 22, 23 are coupled such that at most one of the valves is open. When the valve 22 is opened, the valve 23 will be closed. When the valve 22 is closed, the valve 23 is opened. Thus, the passages, formed in this instance by the capillaries 20 and 21, are opened alternately. The valves 22, 23 are switch-over valves that can be switched between an open state and a closed state. The valve arrangement that in the present embodiment is included in the hand-held device, may alternatively also be accommodated in the main device 10.

Switching between the leak search mode and the leakage rate measuring mode is effected by the switch 24. When this switch is on, the valve 22 is opened and the valve 23 is closed, which corresponds to the leak search mode. When the switch 24 is off, the valve 22 is closed and the valve 23 is opened, which corresponds to the leakage rate measuring mode.

In a sniffing leakage search, a tracer gas is contained in the object under test, e.g. a container. Helium is often used as the tracer gas which, before closing the container, is introduced into the cavities to be tested for leaks. The object under test is then scanned with the sniffing probe 16. The sniffing pipe 18 takes in the tracer gas flowing from a possible leak, conveying the same into the main device 10 where it is analyzed.

First, the leak search mode is set, in which the capillary line 20 is opened and the capillary line 21 is closed. At the same time, a differential display is activated, whereby slowly varying signals of the tracer gas sensor 12 are eliminated. In this state, the environment of the body to be examined is scanned with the sniffing probe by moving the sniffing probe closely along the surface of the body. Thus, an existing leak can be localized. Thereafter, the switch 24 is actuated to switch over to the leakage rate measuring mode. At the same time, the differential display is deactivated and replaced with a direct display of the detection signal. Now, the leakage rate measuring mode is performed exclusively using the narrow capillary line 21. Thus, a quantitative assessment of the leak is obtained with high stability and accuracy.

The invention claimed is:

1. A leakage search assembly having a sniffing probe, comprising a main device containing a vacuum pump and a tracer gas sensor and being connected with the sniffing probe through a flexible tubing, wherein the flexible tubing comprises a first passage and a second passage having different cross sections, that at least the passage having the larger cross section is provided with a valve, and that a switch is provided for switching between a leak search mode, in which the larger passage is open, and a leakage rate measuring mode, in which the larger passage is closed.

2. The leakage search assembly of claim 1, further comprising a means for determining and displaying the variation in time of the signal of the tracer gas sensor.

3. The leakage search assembly of claim 1, wherein the switch is arranged on the sniffing probe.

4. The leakage search assembly of claim 1, wherein the flexible tubing includes at least two capillary lines, wherein one capillary line forms the first passage and the other capillary line forms the second passage.

5. The leakage search assembly of claim 1, wherein the carrier gas flows in the two passages differ by at least the factor 10.

6. The leakage search assembly of claim 1, wherein the at least one valve is contained in the main device.

* * * * *